United States Patent [19]

Boice

[11] Patent Number: 6,141,902

[45] Date of Patent: Nov. 7, 2000

[54] KNOCKDOWN PORTABLE GREENHOUSE AND KIT FOR PARCEL SERVICE SHIPMENT

[76] Inventor: A. Parker Boice, 301 Cardinal Dr., Greenville, S.C. 29609

[21] Appl. No.: 09/065,813

[22] Filed: Apr. 23, 1998

[51] Int. Cl.[7] .............................. A01G 9/00; E04B 1/32; B65D 85/20
[52] U.S. Cl. .................................. 47/17; 52/86; 206/223
[58] Field of Search .......................... 47/17; 52/86, 63; 135/1, 14, 102; 206/223

[56] References Cited

U.S. PATENT DOCUMENTS

| | | |
|---|---|---|
| 525,745 | 9/1894 | Saltmarsh . |
| 1,909,877 | 5/1933 | Marshall . |
| 2,351,419 | 6/1944 | Fuller ........................................... 189/1 |
| 2,816,329 | 12/1957 | Sogaro ........................................ 52/86 |
| 2,869,561 | 1/1959 | Harkness ..................................... 135/1 |
| 3,028,872 | 4/1962 | Cresswell ................................... 135/14 |
| 3,165,110 | 1/1965 | Brooks ........................................ 135/1 |
| 3,224,533 | 12/1965 | Nystrom ..................................... 189/35 |
| 3,961,442 | 6/1976 | Carter ......................................... 47/17 |
| 3,971,176 | 7/1976 | Rannels ...................................... 52/86 |
| 4,067,347 | 1/1978 | Lipinski ..................................... 47/17 |
| 4,068,423 | 1/1978 | Marsh ........................................ 52/86 |
| 4,091,584 | 5/1978 | Brown ........................................ 52/86 |
| 4,831,793 | 5/1989 | Galloway et al. .......................... 52/86 |
| 5,038,517 | 8/1991 | Talbott ....................................... 47/17 |
| 5,297,890 | 3/1994 | Commins ................................. 403/398 |
| 5,333,421 | 8/1994 | McKenna ................................... 52/86 |
| 5,335,684 | 8/1994 | Henninen ................................. 135/102 |
| 5,479,744 | 1/1996 | Meyer ........................................ 52/63 |
| 5,595,203 | 1/1997 | Espinosa ................................... 135/124 |
| 5,598,668 | 2/1997 | Isom ........................................... 52/86 |
| 5,605,007 | 2/1997 | Hinsperger ................................. 47/17 |
| 5,660,002 | 8/1997 | Lashinger ................................... 52/63 |
| 5,730,281 | 3/1998 | Powell et al. ............................. 206/223 |

Primary Examiner—Peter M. Poon
Assistant Examiner—Francis T. Palo
Attorney, Agent, or Firm—Cort Flint

[57] ABSTRACT

A kit for a knockdown greenhouse which is easy to assemble and ship in a conventional parcel service container is disclosed which includes a plurality of base strips for forming a rectangular base frame having first and second parallel side base members and first and second end base members. The base strips have a length generally equal to or less than the length of the container. First and second side base members have a series of anchors spaced along a length of the base members. A plurality of elongated bendable rib sections are included having a length generally less than the length of the container. Couplings are provided for joining ends of a predetermined number of the arch sections together generally end to end to form an arch-shaped rib whereby a plurality of arch-shaped ribs may be constructed. The arch-shaped ribs have first and second anchor ends which are interconnectable with the anchors of side base members to position the arch-shaped ribs upright. Longitudinal rib connectors are provided to interconnect the arch-shaped ribs. A knockdown door assembly is included which interfits with an end base member in an upright configuration and has a movable door. Lattice mounting strips are included for affixing a cover between the mounting strips and the side base members, and the kit includes removable fasteners for securing the mounting strips to the side base members with the cover sandwiched there between.

34 Claims, 4 Drawing Sheets

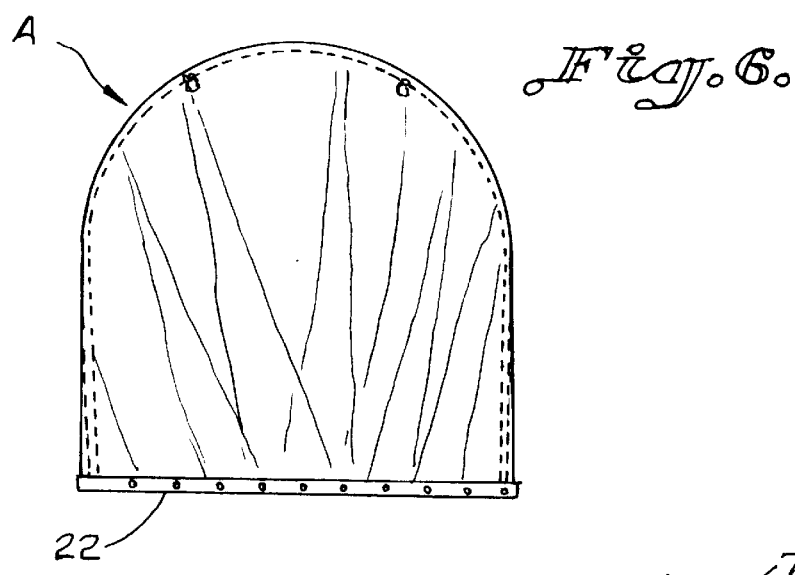
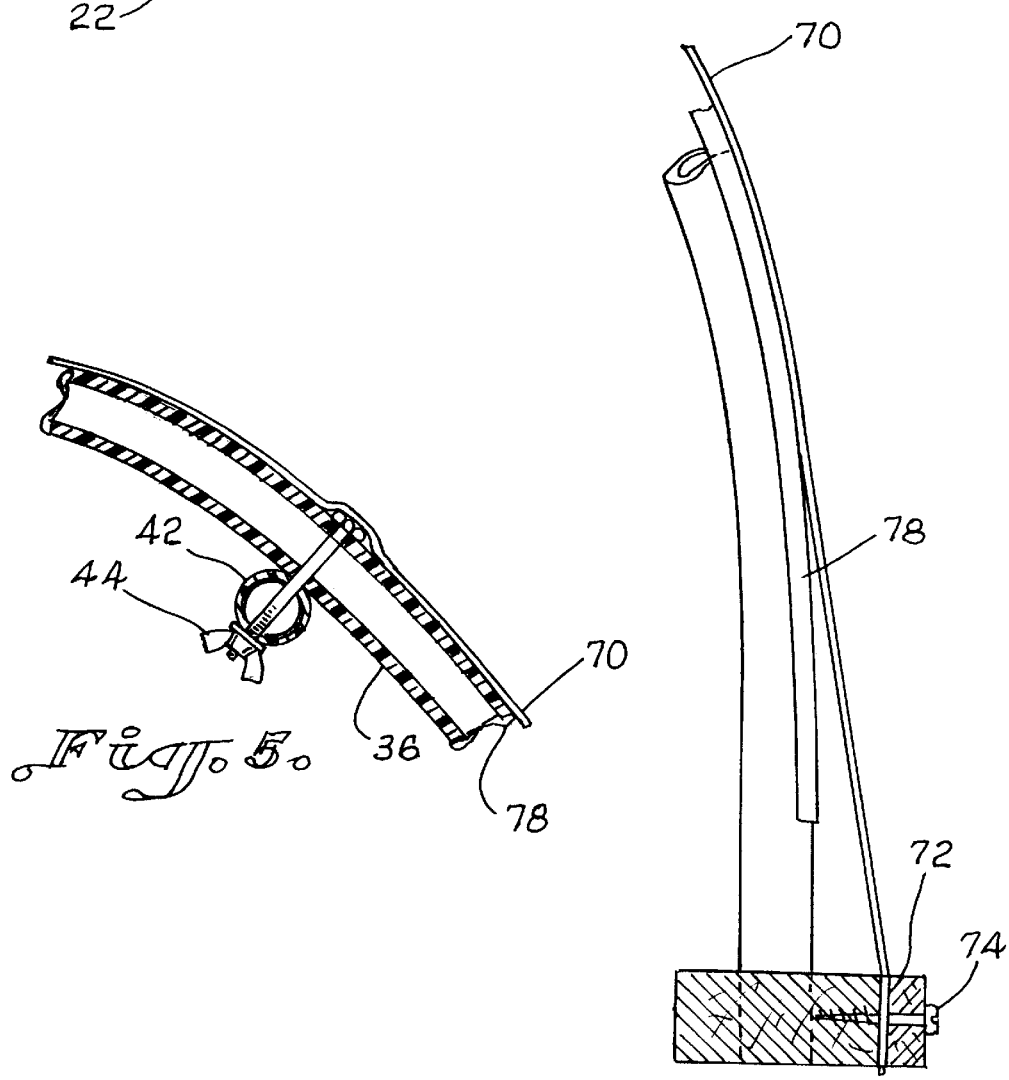

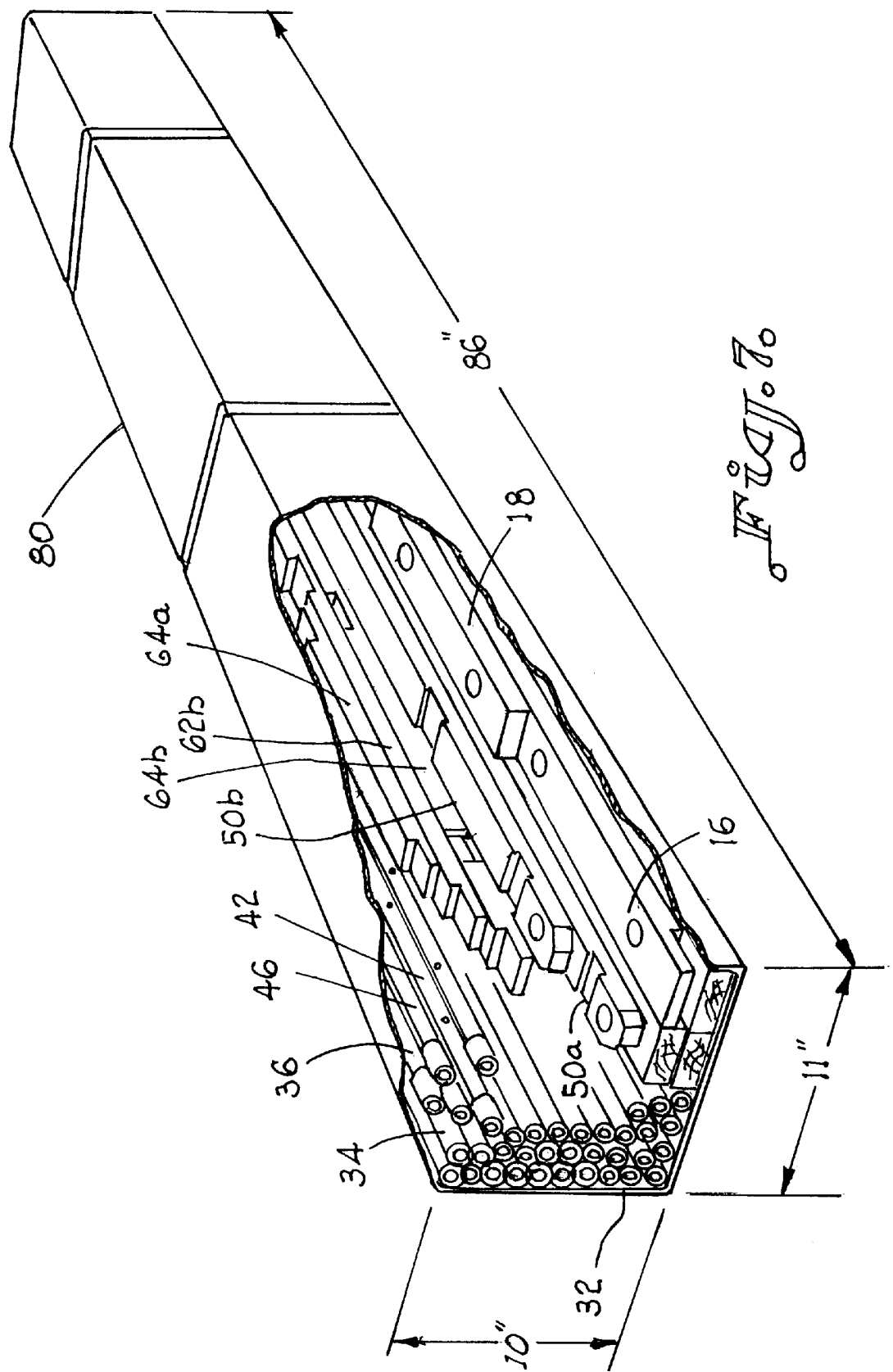

KNOCKDOWN PORTABLE GREENHOUSE AND KIT FOR PARCEL SERVICE SHIPMENT

BACKGROUND OF THE INVENTION

This invention relates to a knockdown greenhouse and the like portable enclosures, and more particularly, to a knockdown greenhouse which is easy to assemble and may be shipped using conventional parcel service.

Heretofore ready to assemble and portable greenhouses and the like enclosures have been provided which are constructed using bendable frame sections that are either pre-stressed or may be flexed during assembly to provide an arch-shaped housing structure. Typical housing structures are shown in U.S. Pat. Nos. 5,595,203, 5,479,744, 5,335,684, 5,333,421, 4,091,584, and 3,028,872.

It is also desirable in knockdown housing units used for greenhouses, that ventilation be provided by having at least one, and preferably two doors. U.S. Pat. Nos. 5,660,002, 4,831,793, 3,971,176, 3,961,442, 2,869,561, and 2,816,329 disclose portable housing structures for greenhouses and the like wherein arch shaped frame sections are utilized having at least one door.

However, the prior housing structures have not taken into account the modern day marketing techniques. With the increasing in popularity of merchandising using the internet, it becomes necessary to provide merchandise which can be easily shipped to a consumer. The problem of packaging a knockdown housing structure such as a greenhouse and the like in a package which can be shipped through conventional postage service, and yet the greenhouse may be easily assembled, is a problem to which considerable attention need be given.

Accordingly, an important object of the present invention is to provide a knockdown housing structure for a greenhouse and the like wherein the structure may be readily and easily assembled.

Another object of the present invention is to provide a knockdown housing structure for a greenhouse and the like which is easy to assemble yet which may be shipped using conventional parcel service.

Another object of the present invention is to provide a simple knockdown housing structure for a greenhouse and the like which is relatively uncomplicated, requires a minimum number of parts, may be readily assembled, and packaged in a conventional parcel container.

Another important object of the present invention is to provide a kit for a knockdown greenhouse which can be packaged in one or more conventional parcel service packages.

SUMMARY OF THE INVENTION

The above objectives are accomplished according to the present invention by providing a knock-down, portable greenhouse structure and kit which may be shipped using conventional parcel service. The structure includes a plurality of base strips forming a rectangular base frame having first and second parallel side base members and first and second end base members. The base strips on said first and second side base members have a series of anchors spaced along a length of the base members. A plurality of elongated bendable rib sections are joined together generally end-to-end to form an arch-shaped rib whereby a plurality of arch-shaped ribs are provided. The arch-shaped ribs have first and second anchor ends receivable in the anchors of the first and second side base members, respectively, to position the arch-shaped ribs in an upright position. First and second longitudinal rib connectors extend longitudinally along opposing sides length of said greenhouse transverse to the arch-shaped ribs to interconnect the arch-shaped ribs. A door assembly is carried by the first end base member in an upright configuration having a movable door. A transverse door connector extends between the first and second rib connectors and is interconnected to the door assembly to secure the door assembly in the upright configuration. A covering is carried over said arch-shaped ribs and secured to the base frame to provide an enclosure within the arch-shaped ribs.

Advantageously, the rectangular base members are formed from cedar wood and the anchors include anchor holes pre-formed in the base members; and fasteners carried by the first and second side base members extend into the anchor holes to engage the first and second anchor ends of the arch-shaped ribs. A lap joint joins intersecting ends of the side base and end base members together at intersecting corners of the base frame. The side and end base members are fastened together by a corner brace extending between intersecting ones of the side and end base members at the corners. Means are provided for securing the corner braces to the earth.

Preferably, longitudinal lattice mounting strips extend generally along a length of the first and second side base members, and the covering is sandwiched between the mounting strips and the side base members, by using removable fasteners, such as wood screws, securing the mounting strips to the side base members with the cover sandwiched there-between.

Advantageously, for parcel service shipment, three of the bendable rib sections are included in each arch-shaped rib, the rib sections being connected generally end-to-end. A first and a second of rib section extend generally upwards from the first and second side frame members, respectively, with their anchor ends secured in the anchor holes, and a third rib section is arched between the first and second rib sections in each rib. The longitudinal rib connectors are fastened to said third rib section of each said arch-shaped rib. Elbow connectors connect the rib connectors to the door connector. Preferably, the transverse door connector extends though aligned door connector openings formed in a door frame of the door assembly.

The greenhouse may be provided in multiple lengths of 7'. When the greenhouse is more than 7' in length, at least a pair of the base strips are joined together in each of the first and second side base members, and a bridge strip bridges overlapping portions of the base strips of the first and second side base members. The bridge strips include anchor holes aligned with anchor holes of the overlapping portions of the base strips.

In the kit form, the shipping container(s) does not exceed 130 inches in length and girth, or 150 lbs. (UPS limitations). Each of the arch-shaped ribs consists of three of said bendable rib sections having a length generally less than or equal to the container. Preferably, PVC tubing is used. Likewise, the base strips of the rectangular base, rib connectors, and door assembly frame members are shorter than the container, and all structural members are less than, or equal to, 7' in length. If the greenhouse is 7" in length, one container may be used. If the greenhouse is 14' in length, two containers are used.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 4 is a sectional view taken along line 4—4 of FIG. 1;

FIG. 5 is a sectional view taken along line 5—5 of FIG. 2;

FIG. 6 is a rear end view of a knockdown greenhouse constructed according to the present invention having only a single front door; and FIG. 7 is a prospective view of a package kit for a knockdown greenhouse according to the invention which may be packaged in a container acceptable for conventional parcel service shipment.

DESCRIPTION OF A PREFERRED EMBODIMENT

Figure 1:
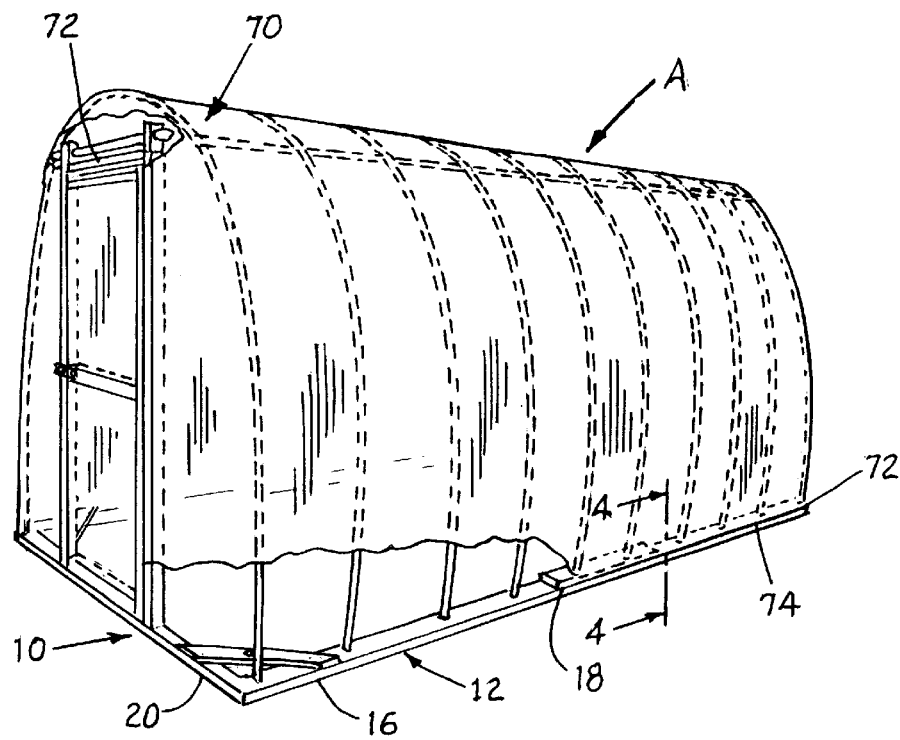
FIG. 1 is a prospective view of a knockdown green-house constructed according to the invention.
Figure 2:
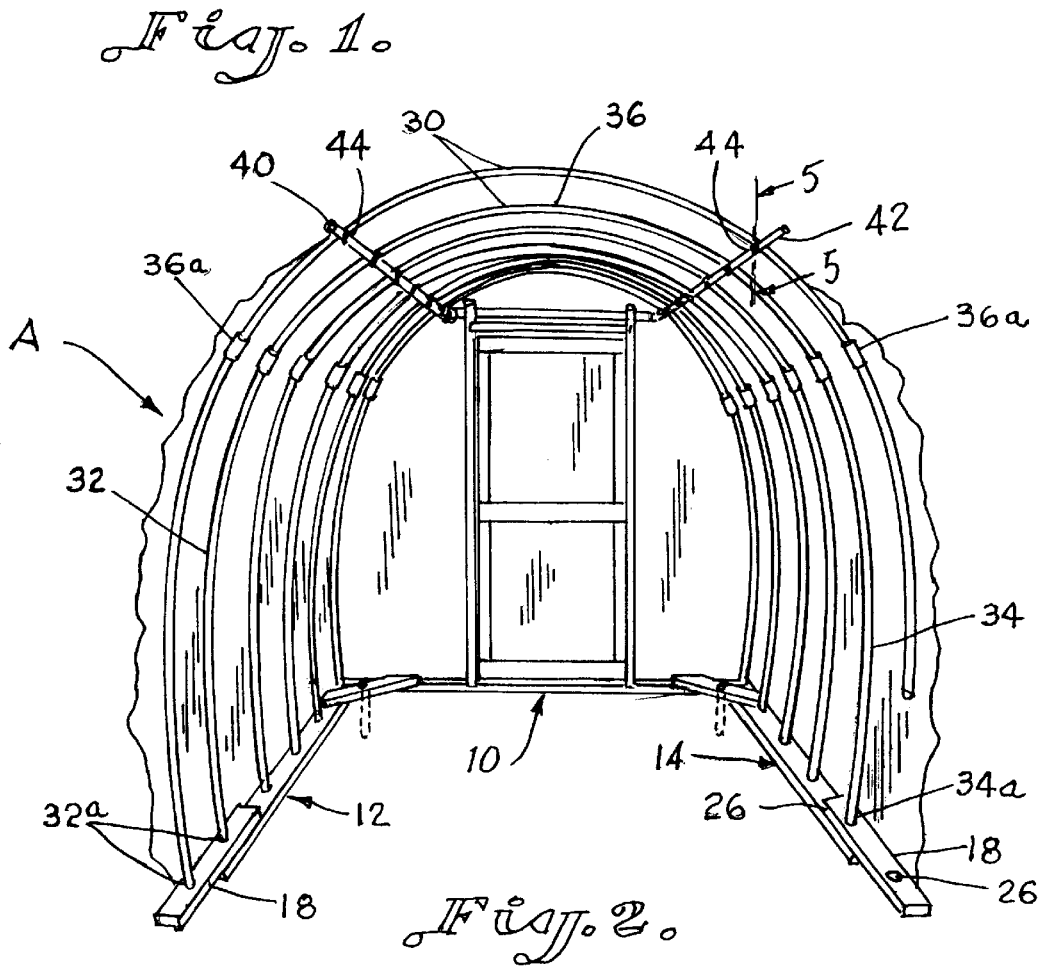
FIG. 2 is an end view with parts cut away of a knockdown greenhouse constructed according to the present invention.

Referring now in more detail to the drawings, the invention will now be described in more detail. As can best be seen in FIG. 1, a knockdown housing structure designated generally as A is illustrated in the form of a greenhouse. The greenhouse includes a base frame, designated generally as 10, which includes a first side base member 12 and a second side base member 14 (FIG. 2). Each side base member comprises a plurality of base strips 16. In the illustrated embodiment, the side base members include two base strips 16 joined together by a bridge plate 18. Base frame 10 is completed by two end base members 20 and 22 (FIG. 6) which each include a single base strip 16. The intersecting ends of the side and end base members are joined by lap joints 24. Conventional fasteners may be used to fasten the lap joint together. It is noted that first and second side base members 12 and 14 have a series of anchors spaced along their length. Preferably the base strip 16 are cedar wood, and the anchors are formed by pre-drilling anchor holes 26 in the wood. For this reason, bridge plate 18 also includes anchor holes 26 which are aligned with the anchor holes in the underlying base strips 16 to receive the anchor ends of the arch-shaped ribs, to be more fully described. By this means the bridge plates are fastened to the base strips and interconnect the two base strips in each side member 12, 14.

As can best be seen in FIG. 2, each arch-shaped rib 30 includes 3 rib sections. There is a first rib section 32 having an anchor end 32a received in an anchor 26 of first side base member 12. There is a second rib section 34 having an anchor end 34a received in anchor 26 of the second side base member 14. A third rib section 36 includes fixed couplings 36a on its opposing ends which receive the free ends of first and second rib sections 32 and 34. Third rib section 36 is arched between the first and second rib sections. Preferably the rib sections are formed from a bend-able material, and preferably are formed from a flexible plastic (PVC tubing) that is hollow. This allows the quick assembly and disassembly of the greenhouse whereupon the rib sections flex back to a generally straight configuration (FIG. 7). There are a plurality of arch ribbed sections 30 spaced along the length of the greenhouse having their anchor ends received in the anchor holes formed in the side base members, as can best be seen in FIG. 1. Interconnecting the arch-shaped ribs 30 in their upstanding configuration are first and second rib connectors 40 and 42 extending longitudinally along a length of the greenhouse and across the individual ribs 30. The rib connectors are connected to the arch shaped ribs 30 by means of conventional connectors such as screws and wing nuts 44.

Figure 3:
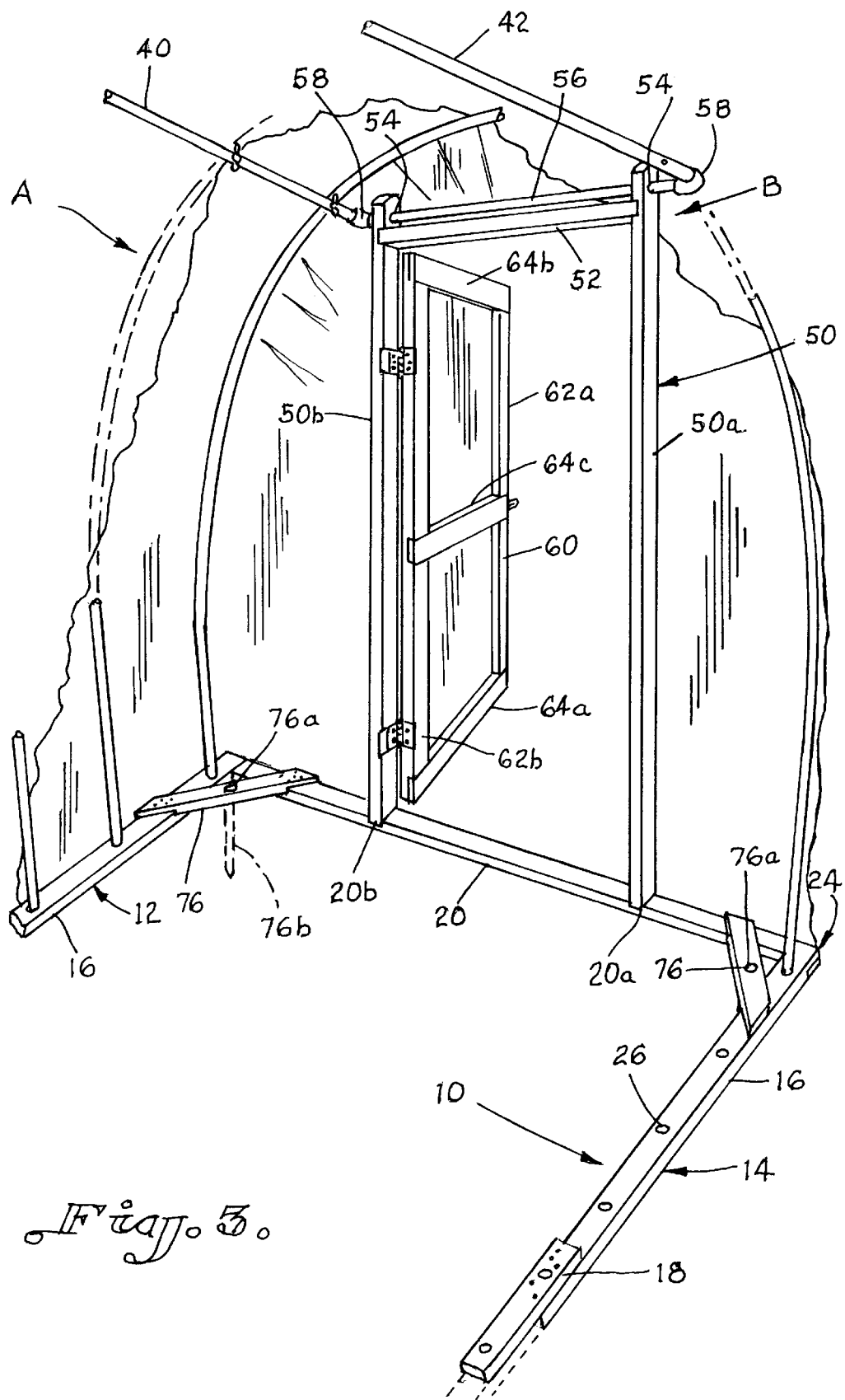
FIG. 3 is a prospective view with parts omitted and cut-away illustrating a knockdown greenhouse having a door assembly according to the invention.

As can best be seen in FIG. 3, a door assembly, designated generally as B, is provided at front end base 20. Typically in greenhouse structures it is desired to have two doors so effective ventilation can be had. However, for purposes of explanation only one door assembly is described, it being understood, that a door assembly of the like construction may be provided at the opposite end of the greenhouse. Door assembly B includes a door frame, designated generally as 50, having a first vertical side frame member 50a and a second vertical side frame member 50b having their free ends received in a notched-out portion 20a and 20b formed in end base member 20. A transverse door frame member 52 extends between the vertical door frame members and is received in notches formed in the door frame members. The upper ends of door frame members 50a and 50b include connector openings 54 through which a door frame connector 56 is received. The free ends of door frame connector 56 are attached to rib connectors 40 and 42 by means of elbow couplings 58. This maintains the door assembly in an upright configuration when installed. A hinged door 60 is carried by door frame 50 in a conventional manner. Door 60 includes vertical door members 62a and 62b connected by means of lap joints to upper and lower door end members 64a and 64b. An intermediate cross door member 64c also is fitted between the vertical door members by means of a lap joint. The door may be disassembled for shipment and assembled at the site of assembly, along with door frame 50.

A covering for the greenhouse structure, designated generally as 70, is provided. The covering is preferably a suitable plastic sheeting. It is desirable to place duct tape 78 over the rib sections of the arch-shaped ribs 30 which contact the cover 70 to prevent the sheeting from contacting the PVC which can shorten the life span of the film. The sheeting is placed over the arch-shaped ribs so that there is about a 3' overhang on each end and each side. Starting along the bottom end of one side, a lattice mounting strip 72 is secured over the sheeting with a series of wood screws 74. The mounting strips have a length generally equal to the length of the base strip 16 so that the same number of mounting strips is used as the number of base strips. The mounting strips are then fastened to each end, including a mounting strip secured across the top of the door frame assembly 50. The excess sheeting is then trimmed away after all the mounting strips have been fastened and secured with wood screws. An opening for the door is cut in the film, and the door is then hung to the door frame by means of hinges. The sheeting is also attached to the door using lattice strips.

After the greenhouse is placed in a desired location, corner braces 76 which are attached across intersecting corners of the side base members 12, 14, and end base members 20, 22 prior to installing arch-shaped ribs 30, are secured to the ground. Corner braces 76 include means for securing the greenhouse to the ground by means of an opening 76a and a stake 76b driven into the ground.

EXAMPLE

As an example, a greenhouse kit will be described for a knockdown greenhouse according to the invention which can be shipped in one or more, depending on its length, conventional parcel service container or package P (FIG. 7) depending on its length.

A conventional parcel service, such as UPS, has single package limitations of 150 lbs., and 130 inches in total dimensions, i.e. the length plus the girth is equal to or less than 130". In the illustrated embodiment, a container P is utilized which is 86"×11"×10", or 128" length plus girth (total dimensions).

In the illustrated embodiment, the greenhouse is 7' wide and 14' in length. The base frame 10 consists of six 7' sections of 2×3 cedar wood. There are two bridge plates 18 of cedar wood, 32" in length to make the 14' side base numbers. First and second rib sections 32 and 34 are 5'5" long, and third center rib section 36 is 6'9¾" long. Rib connectors 40 and 42 each include two 7' lengths of PVC tubing connected together by a coupling. Door frame assembly B includes two door frame post 50*a*, 50*b* which are approximately 77¼" in length. Transverse door frame member 52 is approximately 32" in width. Door 60 includes door elements 62*a* and 62*b* which are approximately 75¾" in length. Door ends 64*a* and 64*b* are approximately 30" in width.

Thus, it can be seen that all of the structural parts of the greenhouse are 7', or less, in length. In the case of a greenhouse having a length of 14', two of the packages P are utilized for all the structural parts in conventional parcel service shipments.

The example above can be modified easily. For example, if it is desired to make a greenhouse 7'×7', then a 7' base strip 16 from each of the side base members 12, 14 is omitted, as well as two bridge plates 18, one-half of the rib-sections, one door assembly, and other miscellaneous parts. The covering is also reduced in size. In this case, the entire greenhouse kit may be shipped in a single package P, shown in FIG. 7. If it is desired to make a greenhouse longer than 14' than two additional base strips 16 can be added to each side base member, along with additional arch-shaped ribs and bridge plates.

Thus it can be seen that an advantageous construction for a knockdown greenhouse can be had according to the invention which is easy to assemble and disassemble, yet may be easily shipped using conventional parcel service. The housing structure may be used for a greenhouse or other outdoor building, and may be readily marketed using modern day internet marketing and other mass media marketing techniques whereupon the product may be easily shipped to the consumer.

While a preferred embodiment of the invention has been described using specific terms, such description is for illustrative purposes only, and it is to be understood that changes and variations may be made without departing from the spirit or scope of the following claims.

What is claimed is:

1. A knock-down, portable greenhouse which is easy to assemble and ship using conventional parcel service comprising:

a plurality of base strips;

a rectangular base frame having first and second parallel side base members and first and second end base members formed from said base strips;

said base strips on said first and second side base members having a series of frame anchors spaced along a length of said base members;

a plurality of elongated bendable rib sections; couplings joining ends of a predetermined number of said rib sections together generally end-to-end to form an arch-shaped rib whereby a plurality of arch-shaped ribs are provided;

said plurality of arch-shaped ribs having first and second anchor ends received in said anchors of said first and second side base members, respectively, to position said arch-shaped ribs in an upright position;

first and second longitudinal rib connectors extending longitudinally along opposing sides and along a length of said greenhouse transverse to said arch-shaped ribs, and means connecting said rib connectors to said arch-shaped ribs to interconnect said arch-shaped ribs;

each of said first and second longitudinal rib connector having a first free end and second free end remote from said first end;

a knock down door assembly carried by said first end base member in an upright configuration having a knockdown door adapted to swing when assembled;

an elongated transverse door connector extending between and connected to said first free ends of said first and second rib connectors; and connector means interconnecting said door assembly and said transverse door connector to secure said door assembly in said upright configuration;

said door assembly including a pair of vertical spaced-apart side frame members, and said connector means includes aligned door connector openings through which said transverse door connector extends to interconnect said transverse door connector and said door assembly so that said door assembly is maintained in said upright configuration; and a covering carried over said arch-shaped ribs and secured to said base frame to provide an enclosure within said arch-shaped ribs.

2. The apparatus of claim 1 including fasteners carried by said first and second side base members affixing said first and second anchor ends of said arch-shaped ribs to said base.

3. The apparatus of claim 2 wherein said anchors include anchor holes formed in said base members; and said fasteners include screws carried by said first and second side base members extending into said anchor holes to engage respective first and second anchor ends of said arch-shaped ribs.

4. The apparatus of claim 1 including a lap joint for joining intersecting ones of said first and second side base members and end base members together at intersecting corners of said base frame.

5. The apparatus of claim 4 wherein said side and end base members are fastened together by a corner brace extending between intersecting ones of said side and end base members at the corners.

6. The apparatus of claim 5 including means securing said corner braces to the earth.

7. The apparatus of claim 1 including longitudinal mounting strips extending generally along a length of said first and second side base members, said covering being sandwiched between said mounting strips and said side base members, and removable fasteners securing said mounting strips to said side base members with said cover sandwiched therebetween.

8. The apparatus of claim 7 including end mounting strips extending generally along a length of said first and second end base members, said covering being sandwiched between said end mounting strips and said end base members, and removable fasteners securing said strips to said end base members with said cover sandwiched therebetween.

9. The apparatus of claim 8 wherein said fasteners include threaded fasteners.

10. The apparatus of claim 9 wherein said side base members, end base members, and mounting strips are constructed from wood, and said fasteners include wood screws.

11. The apparatus of claim 1 including three of said bendable rib sections included in each of said arch-shaped ribs, said rib sections being connected generally end-to-end.

12. The apparatus of claim 11 wherein a first and a second of said rib sections extend generally upwards from said first and second side frame members, respectively, with their anchor ends secured in said anchor holes, and a third of said rib sections is arched between said first and second rib sections.

13. The apparatus of claim 12 wherein said longitudinal rib connectors are fastened to said third rib section of each said arch-shaped rib.

14. The apparatus of claim 13 including ninety degree connectors connecting said first and second rib connectors and said transverse door connector at said first free ends of said first and second rib connectors.

15. The apparatus of claim 1 including at least a pair of said base strips joined together in each of said first and second side base members, and a bridge strip bridging and overlapping portions of said base strips of said first and second side base members.

16. The apparatus of claim 15 wherein said bridge strips include anchor holes aligned with anchor holes of said overlapping portions of said base strips.

17. The apparatus of claim 1 wherein said bendable rib sections include flexible plastic tubing.

18. A kit for a knockdown greenhouse which is easy to assemble and ship in a conventional parcel service container comprising:

a container having a configuration acceptable for shipment via conventional parcel service;

a plurality of base strips for forming a rectangular base frame having first and second parallel side base members and first and second end base members, said base strips having a length generally equal to or less than the length of said container;

at least said first and second side base members having a series of frame anchors spaced along a length of said base members;

a plurality of elongated bendable rib sections having a fixed length generally less than the length of said container;

couplings for joining ends of a predetermined number of said arch sections together generally end to end to form an arch-shaped rib whereby a plurality of arch-shaped ribs are provided;

said arch-shaped ribs having first and second anchor ends which can be interconnected with said anchors of said first and second side base members, respectively, to position said arch-shaped ribs in an upright position when assembled;

first and second longitudinal rib connectors for extending along a length of said greenhouse transverse to said arch-shaped ribs when assembled adapted for connecting said rib connectors to said arch-shaped ribs to interconnect said arch-shaped ribs when assembled;

a knockdown door assembly adapted for attachment to at least said first end base member in an upright configuration, said door assembly including a pair of vertical door frame elements which fit within said container for shipment, and said door assembly having a knockdown door which fits into said container; and a transverse door connector for extending between said first and second rib connectors and interconnecting to said door assembly when said first and second rib connectors and door assembly are assembled to secure said door assembly in said upright configuration and connector means which includes aligned door connector openings through which said transverse door connector extends to interconnect said transverse door connector and said door assembly so that said door assembly is maintained in said upright configuration.

19. The kit of claim 18 wherein said first and second side base members and end base members include lap joints for joining said base members together at intersecting corners thereof.

20. The kit of claim 19 including a corner brace for interconnecting said side and end base members at said corners including means for securing said corner braces to the earth.

21. The kit of claim 18 including longitudinal mounting strips for extending generally along a length of said first and second side base members to affix a cover between said mounting strips and said side base members, and said kit including removable fasteners for securing said mounting strips to said side base members with said cover sandwiched there between.

22. The kit of claim 21 wherein said side base members, end base members, and mounting strips are constructed from wood, and said fasteners include wood screws.

23. The kit of claim 18 each of said arch-shaped ribs consists of three of said bendable rib sections being connected generally end-to-end, and each said rib sections has a length generally less than or equal to said container.

24. The kit of claim 23 wherein a first and a second of said rib sections are provided for extending upwards from said first and second side frame members, respectively, with their anchor ends secured in said anchor holes, and a third of said rib sections is provided for being arched between said first and second rib sections when said rib sections are assembled.

25. The apparatus of claim 24 wherein said longitudinal rib connectors are adapted to be fastened to said third rib section of each said arch-shaped ribs when assembled.

26. The kit claim 18 including a bridge strip for bringing and interconnecting a pair of adjoining base strips in each of said first and second side base members when assembled.

27. The kit of claim 18 including a door assembly having a door frame with a pair of vertical door frame elements and a transverse door frame element; and said vertical frame elements having a length generally equal to be less than said container.

28. The kit of claim 18 wherein the total dimensions of said container are less than or equal to 130".

29. The apparatus of claim 18 wherein said aligned connector openings include aligned connector openings formed in upper ends of said side frame elements for receiving said transverse door connection when assembled.

30. The kit of claim 18 wherein said vertical door frame elements have length generally equal to be less than said container.

31. The apparatus of claim 1 wherein said knockdown door assembly includes a pair of vertical door elements, and a transverse door element for spacing said vertical door elements apart.

32. The apparatus of claim 1 wherein said aligned door connector openings include aligned openings formed in upper portions of said vertical door elements through which said transverse door connector extends to interconnect said transverse door connector and said door assembly.

33. The apparatus of claim 32 including means attaching said vertical door elements to said first end base member of said base.

34. The apparatus of claim 33 including connector fittings joining said first free ends of said longitudinal rib connectors to opposing ends of said transverse door connector extending through said vertical door element.

\* \* \* \* \*